F. LILLICH.
WHEEL FENDER.
APPLICATION FILED FEB. 21, 1913.
1,118,562.
Patented Nov. 24, 1914.
4 SHEETS—SHEET 3.
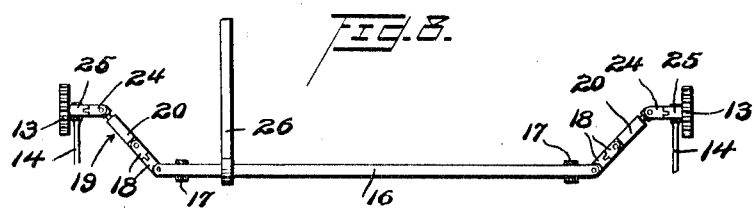
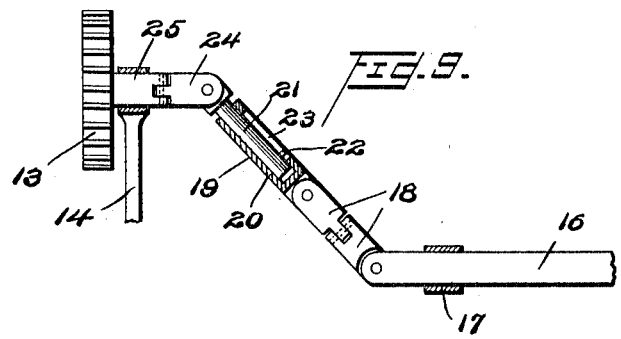
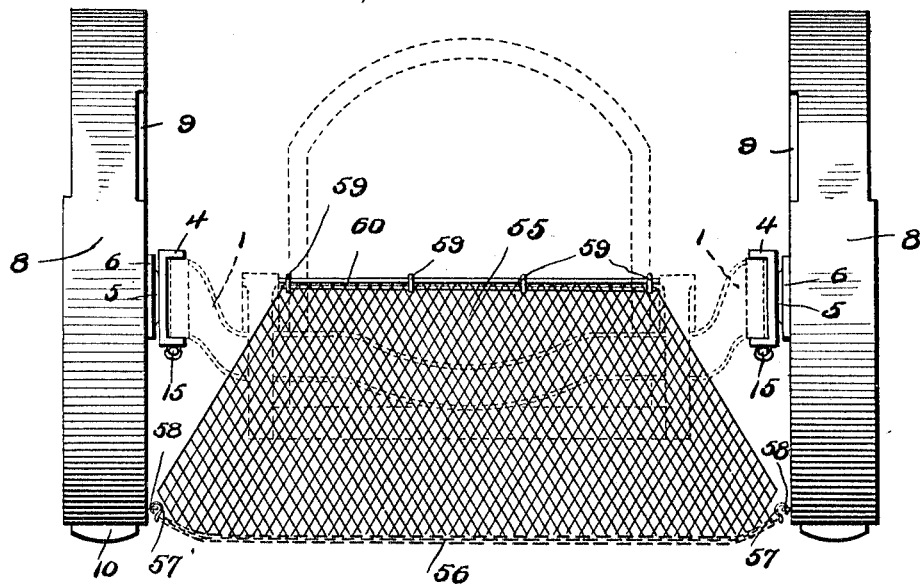
Inventor
Frederick Lillich
Witnesses
By Joshua R. H. Potts
Attorney

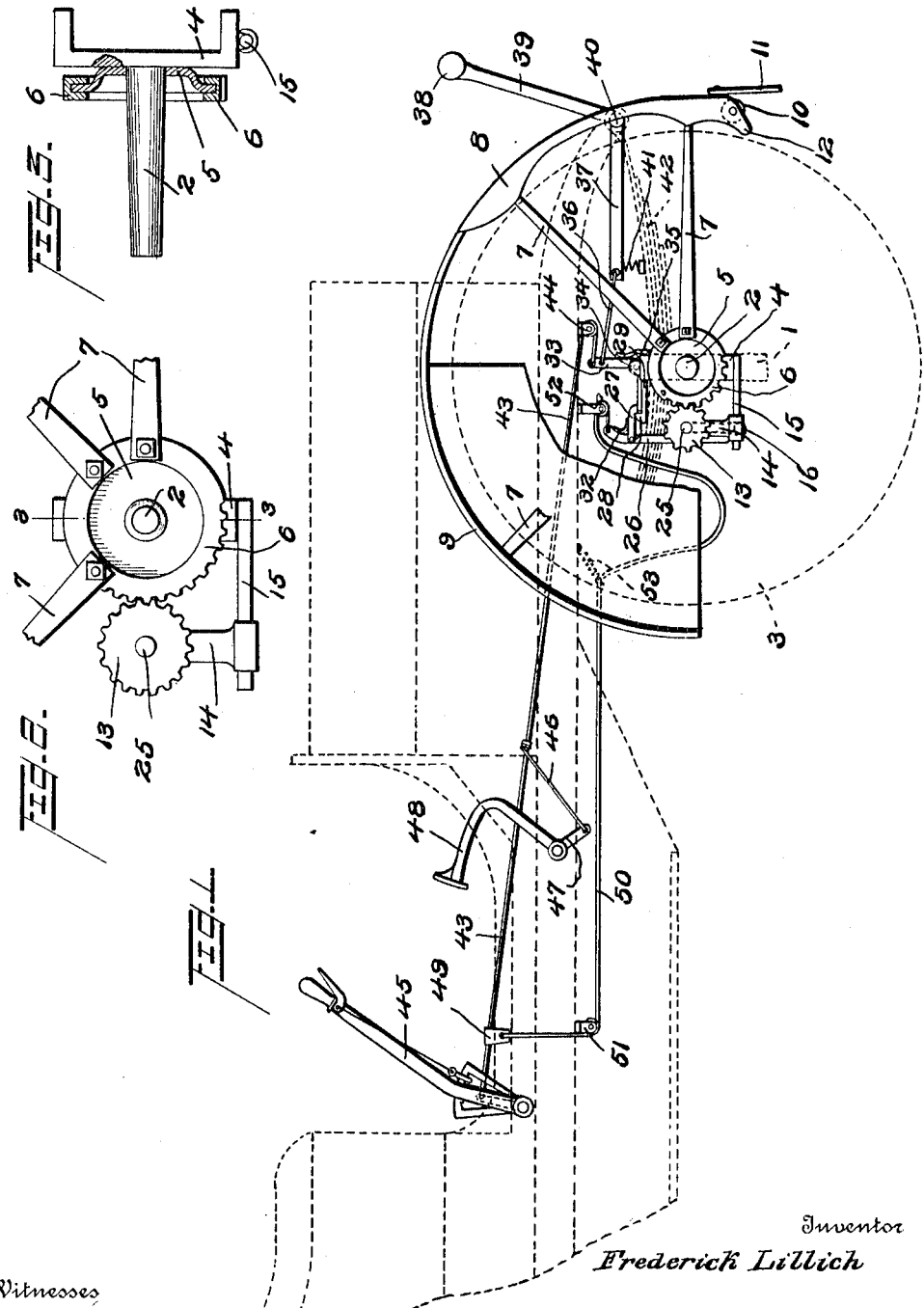

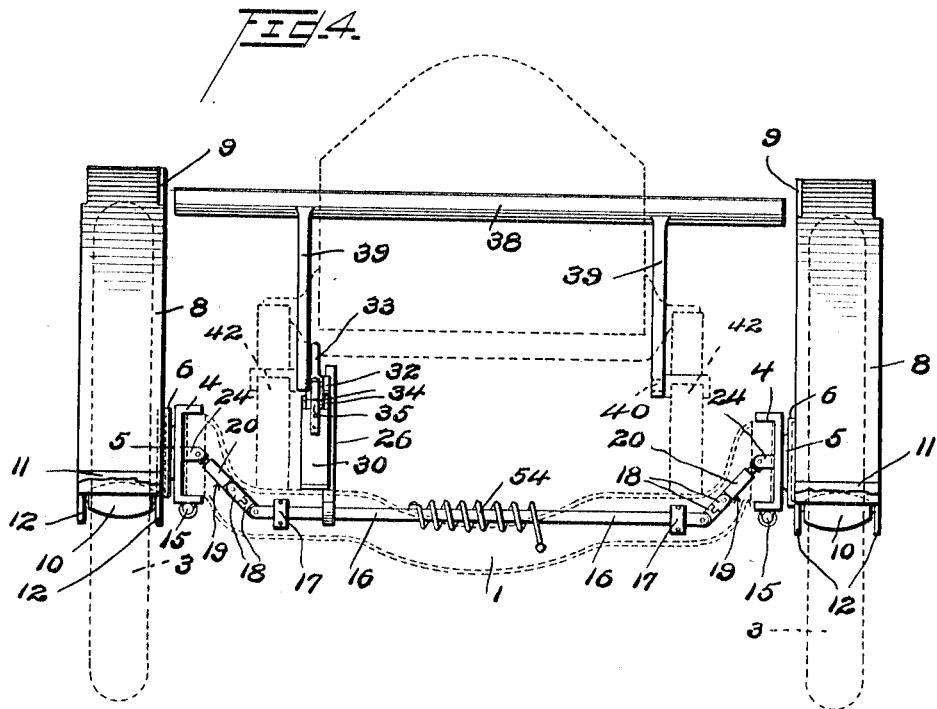
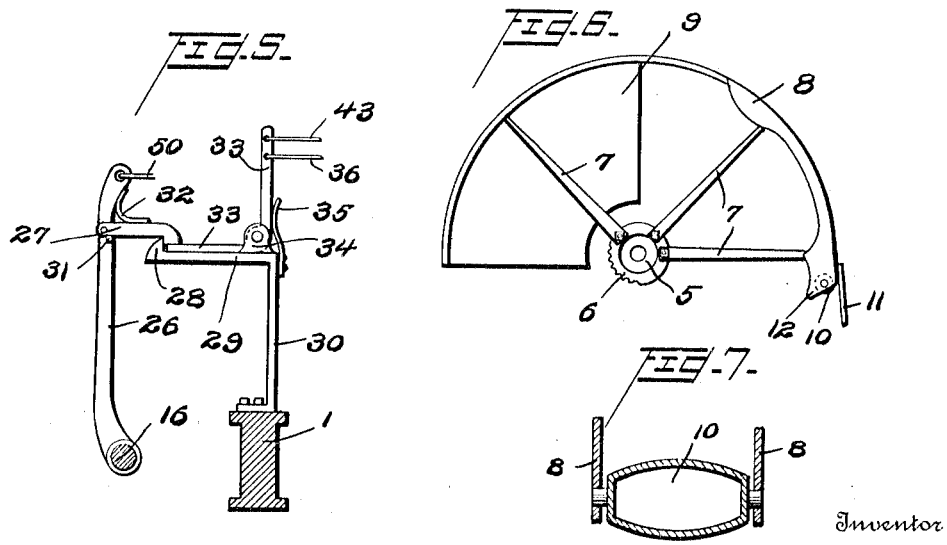

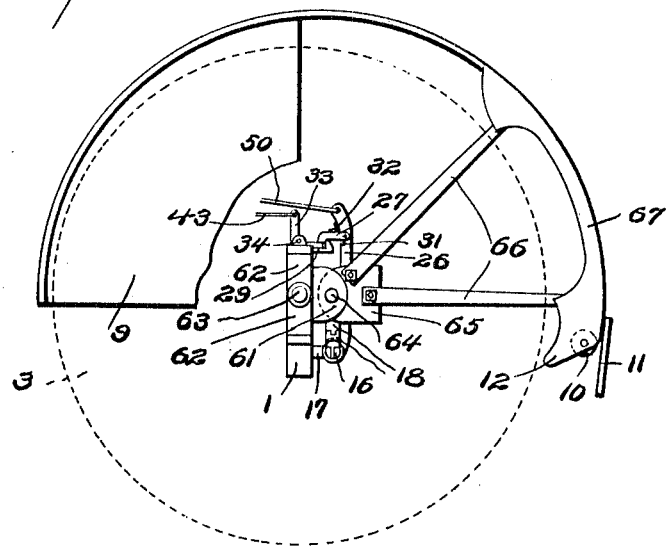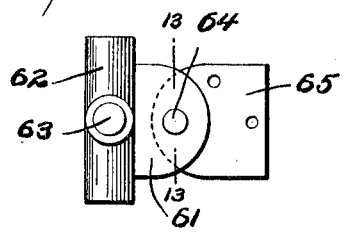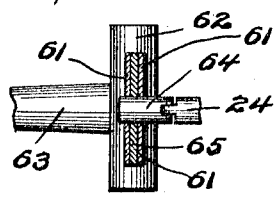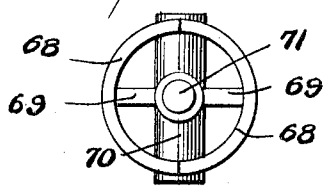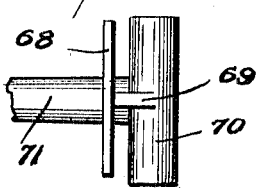

UNITED STATES PATENT OFFICE.

FREDERICK LILLICH, OF PHILADELPHIA, PENNSYLVANIA.

WHEEL-FENDER.

1,118,562.　　　　Specification of Letters Patent.　　Patented Nov. 24, 1914.

Application filed February 21, 1913. Serial No. 749,762.

*To all whom it may concern:*

Be it known that I, FREDERICK LILLICH, a citizen of the United States, residing at Philadelphia, in the county of Philadelphia and State of Pennsylvania, have invented certain new and useful Improvements in Wheel-Fenders, of which the following is a specification.

My invention relates to improvements in wheel fenders, and more particularly to fenders for automobiles and similar vehicles, the object of the invention being to provide wheel fenders which are held normally in an elevated position, yet permitted to quickly lower into operative position, and prevent the wheels from running over a person or object.

A further object is to provide an improved arrangement of combined fender and mud guard with improved means for operating the fender.

A further object is to provide improvements of this character which can be controlled entirely by the operator without leaving the seat.

A further object is to improve upon the construction illustrated in Patent No. 1,011,214 granted to me December 12, 1911.

With these and other objects in view, the invention consists in certain novel features of construction and combinations and arrangements of parts as will be more fully hereinafter described and pointed out in the claims.

In the accompanying drawings: Figure 1 is a view illustrating my improvements in side elevation, showing the same attached to an automobile, the latter being illustrated in dotted lines. Fig. 2 is an enlarged fragmentary elevation illustrating the fender supporting segmental gear and its operating pinion. Fig. 3 is a view in section on the line 3—3 of Fig. 2. Fig. 4 is an end view of Fig. 1. Fig. 5 is an enlarged view in section illustrating the tripping mechanism of the fenders. Fig. 6 is a view in elevation of the combined fender and mud guard. Fig. 7 is a view on an enlarged scale in longitudinal section through roller 10, and illustrating the rotary support therefor in the fender 8. Fig. 8 is a view in elevation of the fender operating shaft. Fig. 9 is an enlarged view partly in elevation and partly in section illustrating one flexible end of this shaft and its pinion connection. Fig. 10 is an end view illustrating a modification. Fig. 11 is a fragmentary view in side elevation illustrating a modification. Fig. 12 is an enlarged view in elevation illustrating the pivotal support of the fenders shown in Fig. 11. Fig. 13 is a view in section on the line 13—13 of Fig. 12, and Figs. 14 and 15 are views in elevation at right angles to each other illustrating another modification.

Referring to my improvements illustrated in Figs. 1 to 9 inclusive, 1 represents the front axle of an automobile and 2, 2, are the pivoted axle stubs on which wheels 3 are mounted. The stubs 2 are integral with brackets 4, and to the brackets 4, disks 5 are secured, preferably by welding. These disks 5 have their edges off-set to receive internally grooved segmental gears 6. In other words, the disks constitute a rotary mounting for the gears, and the said gears are connected by arms 7 with fenders 8. The fenders lie in front of the wheels 3, and are preferably provided with mud guards 9. As a matter of fact, the fenders and the mud guards may be made of a single piece. The lower free ends of the fenders are provided with rollers 10 to roll on the ground, and with flexible tongues 11 which lie in front of the rollers and prevent any possibility of the clothing of a person being caught in the roller.

The extreme lower ends of the fenders are extended rearwardly and beveled or inclined as shown at 12. This extended surface, when in contact with the ground, permits the fenders to bridge gaps in the pavement, as for example, spaces between cobble stones, so that there is no likelihood of the fenders moving down between cobble stones or in holes which would be injurious to the fenders.

To operate the fenders, pinions 13 are provided which mesh with the teeth of the segmental gears 6 and are held in mesh therewith by brackets 14 on arms 15 secured to the brackets 4. The pinions 13 are operated by a flexible shaft 16, the intermediate straight portion of which being supported in bearings 17 on the axle 1. At both ends of the intermediate straight portion of the shaft 16, pivotally coupled links 18 are located and connect the straight portion of the shaft with longitudinally adjustable couplings 19. These couplings 19 each comprise a tubular member 20 in which a cylindrical rod 21 is mounted. A pin 22 on rod 21 extends through a longitudinal slot 23 in the tubular member 20, so that while the parts may be moved longitudinally, they are compelled to turn together. A link 24 pivotally connects the coupling 19 with a short stub 25 on which the pinion 13 is secured. The shaft 16 is provided with an upwardly projecting crank arm 26, and on the latter, a pivoted catch 27 is provided and adapted to engage over a beveled enlargement 28 on an arm 29, the latter being fixed to a bracket 30 secured to axle 1.

A shoulder 31 limits the downward pivotal movement of the catch 27, and a spring 32 exerts downward pressure upon said catch. An angle lever 33 is pivotally supported in ears 34 on the arm 28, and at its horizontal end normally lies below the free end of the catch 27. A spring 35 holds this lever 33 in normal position, and when this lever 33 is moved to elevate the catch 27 over the enlargement 28, the fenders are permitted to fall by gravity as will be understood.

The vertical member of the lever 33 is connected by a flexible device 36 with a crank arm 37 on a pivoted bumper 38. This bumper may be made in the ordinary form of a transverse rod with arms 39 connecting the same with pivot points 40 provided on the chassis frame ends, so that the bumper has a pivotal movement, cushioned by coiled springs 41 placed below the arms 37 and preferably supported upon the elliptical springs 42 of the vehicle, although they may be otherwise mounted. In any event, the springs 41 serve to hold the bumper 38 in normal position, and not only cushion the contact of the same when striking a person or object, but also limit the movement of the bumper. It will be seen that when this bumper is moved rearwardly by contact with a person, the downward movement of the arm 37, through the medium of the flexible device 36, will operate the lever 33 and lift the catch 27, so that the fenders may fall.

A flexible device 43 is secured to the vertical member of the lever 33, extends forwardly a short distance, and is passed around a pulley 44 fixed to the vehicle frame. The flexible device 43 then extends rearwardly, and is attached to the brake lever 45. This flexible device 43 is also connected by a flexible device 46 with a crank arm 47 on the emergency brake lever 48, so that when either of these brake levers are operated, the fenders will be permitted to fall.

To bring the fenders back to normal position, I provide a pull 49 which is located in convenient reach of the operator, and this pull is connected by a flexible device 50 with the upper end of the crank arm 26. The said flexible device is passed under a pulley 51 secured to the vehicle frame, and over a pulley 52, the latter being secured to the vehicle frame in advance of the arm 26, so that by the operation of the pull, the arm 26 receives a forward motion. In order that the arm may swing to let the fenders drop, it is necessary to provide slack in this flexible device, and this slack is confined to the forward portion of the flexible device by reason of a coiled spring 53 which connects the flexible device 50 with the vehicle frame, as clearly shown in Fig. 1.

While it is possible that the fenders will fall by gravity, in order that there may be no defect and to insure the quick dropping of the fenders, I provide a coiled spring 54, which is located around the shaft 16, connected at one end to the shaft, and at its other end to the axle 1, so that this spring tends always to turn the shaft 16 in a direction to lower the fenders.

Fig. 1 shows the parts in normal position. If either of the levers 45 or 48 are operated, or if a person strikes the bumper 38, lever 33 will be operated to lift the catch 27 and the fenders will fall into position with the rollers 10 in contact with the ground, so that a person or object will be forced to one side, and the wheels will not pass over them.

To elevate the fenders, it is simply necessary to draw the pull 49 upwardly, and through the medium of the flexible device 50 and crank arm 26, the shaft 16 will be revolved. The pinions 13 on the ends of this shaft 16 transmit motion to the segmental gears 6, and as the latter are rigidly connected to the fenders by means of the arms 7, the fenders will be elevated to the desired position.

It will be noted that the arms 7 are on the inner side of the vehicle wheel only, so that my improvements do not interfere with the removal of the wheel whenever desired.

By providing the mud guards 9 as extensions of the fender, I can dispense with the ordinary mud guards which extend up the sides of the vehicle at the front.

In the modification illustrated in Fig. 10, I illustrate a rope netting 55 which acts as a pick up or scoop fender. This netting has a chain 56 at its lower edge which drags over the ground, and is connected by hooks 57 with eyes 58 on the wheel fender 8. The upper end of the netting 56 is connected by hooks 59 with a rod 60, the latter preferably being supported on some portion of the vehicle.

In the modification illustrated in Figs. 11, 12, and 13, forwardly projecting plates 61 are welded to the vertical member 62 of the axle stub 63, and provide rotary mounting for a shaft 64. This shaft 64 extends through, and is secured to, a plate 65, and this plate 65 is connected by arms 66 with the fender 67, corresponding to the fender 8 above described. The shaft 64 is flexible and in construction is precisely like shaft 16, except that it is located at the front of the axle 1. It is operated in precisely the same manner as shaft 16, and in Fig. 11, I have illustrated the operating means of this shaft, giving the parts the same reference characters as in the preferred form, as such parts are identical in construction, but simply reversed in order to properly operate with the shaft 64 on the front of the axle 1.

In Figs. 14 and 15, I illustrate a modification in which the mounting for the gear 6 comprises two semi-circular sections 68 which are connected by arms 69 with the vertical member 70 of the axle stub 71. The parts are preferably welded together, and this manner of assemblage lends itself to certain forms of the device.

It is to be understood that the sections 68 when together constitute a complete ring or disk to receive the grooved segmental gear 6 as above explained.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a vehicle, wheel fenders having rotary mounting on the vehicle, a spring exerting pressure to move the fenders downwardly, a pivoted catch normally holding said fenders in elevated position, and means for elevating the catch to release the fender and allow it to fall, substantially as described.

2. The combination with a vehicle, of a shaft supported on the vehicle, pivoted wheel fenders operatively connected with the shaft, a crank arm on the shaft, a fixed arm having a beveled enlargement thereon, a pivoted catch on the crank arm engaging over said enlargement, and a lever adapted to move the catch out of operative engagement with the enlargement, substantially as described.

3. The combination with a vehicle, of a shaft supported on the vehicle, pivoted wheel fenders operatively connected with the shaft, a crank arm on the shaft, a fixed arm having a beveled enlargement thereon, a pivoted catch on the crank arm engaging over said enlargement, an angle lever pivotally supported on the arm and having its horizontal member located under the free end of the catch, and means for moving the angle lever, substantially as described.

4. The combination with a vehicle, of a shaft supported on the vehicle, pivoted wheel fenders operatively connected with the shaft, a crank arm on the shaft, a fixed arm having a beveled enlargement thereon, a pivoted catch on the crank arm engaging over said enlargement, an angle lever pivotally supported on the arm and having its horizontal member located under the free end of the catch, a pivoted bumper, and a flexible device connecting the bumper with the angle lever, substantially as described.

5. The combination with a vehicle having axle stubs thereon, of segmental gears having rotary mounting on the vehicle adjacent the axle stubs, wheel fenders connected to said segmental gears, a flexible shaft, pinions on the flexible shaft meshing with the segmental gears, and means for turning said flexible shaft, substantially as described.

6. The combination with a vehicle having axle stubs thereon, of segmental gears having rotary mounting on the vehicle adjacent the axle stubs, wheel fenders connected to said segmental gears, a flexible shaft, pinions on the flexible shaft meshing with the segmental gears, a crank arm on the flexible shaft, a catch on the crank arm normally holding the shaft against movement and the fenders in elevated position, means for moving the crank arm into normal elevated position, and means for releasing the catch permitting the crank arm and fenders to fall, substantially as described.

7. The combination with a vehicle having axle stubs thereon, of segmental gears having rotary mounting on the vehicle adjacent the axle stubs, wheel fenders connected to said segmental gears, a flexible shaft, pinions on the flexible shaft meshing with the segmental gears, a crank arm on the flexible shaft, a catch on the crank arm normally holding the shaft against movement and the fenders in elevated position, means for moving the crank arm into normal elevated position, means for releasing the catch permitting the crank arm and fenders to fall, and a spring on said flexible shaft tending to turn the same in a direction to lower the fender, substantially as described.

8. The combination with a vehicle, an axle on the vehicle, pivoted stubs on the axle, disks secured around the stubs, segmental gears mounted to turn on the disks, wheel fenders secured to the segmental gears, a flexible shaft supported on the axle, pinions on the flexible shaft engaging the segmental gears, a crank arm on the flexible shaft, a catch normally holding the crank arm in elevated position, and a flexible device adapted when moved to draw the arm to normal position, substantially as described.

9. The combination with a vehicle, an axle on the vehicle, pivoted stubs on the axle, disks secured around the stubs, segmental gears mounted to turn on the disks, wheel fenders secured to the segmental gears, a flexible shaft supported on the axle, pinions on the flexible shaft engaging the segmental gears, a crank arm on the flexible shaft, a catch normally holding the crank arm in elevated position, a flexible device adapted when moved to draw the arm to normal position, and a spring connecting the said flexible device with the vehicle whereby slack is permitted in the forward portion of said flexible device to allow the arm to swing downward and the fenders to fall, substantially as described.

10. In a vehicle, the combination of the front axle, stubs hinged to the ends of the axle by knuckle joints, wheels journaled upon the stubs, fenders arranged in front of the wheels and hinged to the stubs upon transverse axes substantially parallel to the axes of the wheels, means for raising the fenders carried upon the vehicle within reach of the operator's seat, a spring exerting pressure to move the fenders downwardly, latch means for holding the fenders in raised position while swinging about the knuckle joint pivots, and manually operated means for operating the latch means for releasing the fenders to cause them to drop, substantially as described.

11. In a vehicle, the combination of the front axle, stubs hinged to the ends of the axle by knuckle joints, wheels journaled upon the stubs, fenders arranged in front of the wheels and hinged to the stubs upon transverse axes substantially parallel to the axes of the wheels, said fenders being of metal in curved form and provided at their lower ends with a shoe of yielding material, means for raising the fenders carried upon the vehicle within the reach of the operator's seat, latch means for holding the fenders in raised position while swinging about the knuckle joint pivots, and manually operated means for operating the latch means for releasing the fenders to cause them to drop, substantially as described.

12. In a vehicle, the combination of the front axle, stubs hinged to the ends of the axle by knuckle joints, wheels journaled upon the stubs, fenders arranged in front of the wheels and hinged to the stubs upon transverse axes substantially parallel to the axes of the wheels, said fenders having their lower ends provided with flexible shoes, means for normally supporting and quickly lowering the fenders into positive contact with the ground carried upon the vehicle within reach of the operator's seat, latch means for holding the fenders in raised position while swinging about the knuckle joint pivots, and manually operated means for operating the latch means for releasing the fenders to cause them to drop, substantially as described.

13. An automobile provided with a front axle having stubs hinged to the axle by knuckle joints and wheels journaled upon the stubs, combined with fenders arranged in front of the wheels, supporting means for the fenders arranged wholly to the inner sides of the wheels and hinged to the stubs adjacent to the knuckle joints, means for supporting the fenders in elevated position, means leading from the operator's seat for raising the fenders to normal elevated position, and releasing means for operating upon the supporting means to release the fenders and permit them to fall, said means being carried upon the axle and also extending to the operator's seat, substantially as described.

14. An automobile provided with a front axle having stubs hinged to the axle by knuckle joints and wheels journaled upon the stubs, combined with fenders arranged in front of the wheels, supporting means for the fenders arranged wholly to the inner sides of the wheels and hinged to the stubs adjacent to the knuckle joints, means for supporting the fenders in elevated position, means leading from the operator's seat for raising the fenders to normal elevated position, releasing means for operating upon the supporting means to release the fenders and permit them to fall, said means being carried upon the axle, a movable transverse guard located across the front of the automobile, and connections between the movable transverse guard and the releasing means, substantially as described.

15. An automobile provided with a front axle having stubs hinged to the axle by knuckle joints and wheels journaled upon the stubs, combined with fenders arranged in front of the wheels, supporting means for the fenders arranged wholly to the inner sides of the wheels and hinged to the stubs adjacent to the knuckle joints, means for supporting the fenders in elevated position, means leading from the operator's seat for raising the fenders to normal elevated position, releasing means for operating upon the supporting means to release the fenders and permit them to fall, said means being carried upon the axle and also extending to the operator's seat, a movable transverse guard located across the front of the automobile, and connections between the movable transverse guard and the releasing means, substantially as described.

16. An automobile, provided with a front axle having axle stubs at the end connected by knuckle joints and wheels on the stubs, combined with fenders hinged to the stub ends, rotary parts journaled on the stub ends for raising the fenders in front of the wheels, a rock shaft journaled on the front axle, universally jointed extensions from the rock shaft to the rotary parts on the stub ends, a latch for holding the rock shaft in adjusted position for holding the fenders in raised position, and latch releasing means extending to the operator's seat, substantially as described.

17. An automobile, provided with a front axle having axle stubs at the end connected by knuckle joints, and wheels on the stubs, combined with fenders hinged to the stub ends, rotary parts journaled on the stub ends for raising the fenders in front of the wheels, a rock shaft journaled on the front axle, universally jointed extensions from the rock shaft to the rotary parts on the stub ends, a latch for holding the rock shaft in adjusted position for holding the fenders in raised position, and latch releasing means extending to the front of the automobile and terminating in a transverse bumper thereon, substantially as described.

18. An automobile provided with a front axle having stubs hinged to the axle by knuckle joints and wheels journaled upon the stubs, combined with fenders arranged in front of the wheels, supporting means for the fenders arranged wholly to the inner sides of the wheels and hinged to the stubs adjacent to the knuckle joints, means for supporting the fenders in elevated position, means leading from the operator's seat for raising the fenders to normal elevated position, releasing means for operating upon the supporting means to release the fenders and permit them to fall, said means being carried upon the axle and also extending to the operator's seat, and a net guard arranged at the front of the automobile and having its lower end connected to the wheel fenders whereby it is lowered automatically when the fenders are dropped, substantially as described.

19. In an automobile, the combination with a front axle having a stub end hinged to the axle by a knuckle joint, a wheel journaled on the stub end, a fender extending in front of the wheel and free from obstruction on the outer side of the wheel and having supporting parts extending radially inward on the inner side of the wheel and hinged to the stub end adjacent to the knuckle joint, and means extending from the stub end to the axle for supporting the fender in raised position, substantially as described.

20. In an automobile, a metal fender for the front wheel hinged to the axle part, said fender being positioned directly in front of the wheel, a roller mounted in the lower end of the fender, and a shoe of yielding material secured at its upper end to the fender in front of the roller said shoe having its lower end projecting below the roller and adapted to be bent backwardly when contacting with the ground, whereby the shoe will bend under the roller and the contact of a person or object with the roller prevented, substantially as described.

In testimony whereof I have signed my name to this specification in the presence of two subscribing witnesses.

FREDERICK LILLICH.

Witnesses:
R. H. KRENKEL,
S. W. FOSTER.

Copies of this patent may be obtained for five cents each, by addressing the "Commissioner of Patents, Washington, D. C."